(12) United States Patent
Sieder et al.

(10) Patent No.: US 8,529,857 B2
(45) Date of Patent: Sep. 10, 2013

(54) RETENTION OF AMINES IN THE REMOVAL OF ACID GASES BY MEANS OF AMINE ABSORPTION MEDIA

(75) Inventors: Georg Sieder, Bad Dürkheim (DE); Ralf Notz, Ludwigshafen (DE); Hugo Rafael Garcia Andarcia, Mannheim (DE); Sandra Schmidt, Essen (DE); Peter Moser, Köln (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/436,113

(22) Filed: Mar. 30, 2012

(65) Prior Publication Data

US 2012/0251418 A1   Oct. 4, 2012

Related U.S. Application Data

(60) Provisional application No. 61/469,902, filed on Mar. 31, 2011.

(51) Int. Cl.
*B01D 53/62* (2006.01)

(52) U.S. Cl.
USPC .......................................... 423/228; 423/229

(58) Field of Classification Search
USPC ................................................. 423/228, 229
See application file for complete search history.

(56) References Cited

U.S. PATENT DOCUMENTS

| | | | |
|---|---|---|---|
| 3,829,521 A * | 8/1974 | Green | 95/161 |
| 2003/0045756 A1 | 3/2003 | Mimura et al. | |
| 2008/0159937 A1 | 7/2008 | Ouimet | |
| 2009/0282977 A1 | 11/2009 | Koss | |
| 2010/0288125 A1 | 11/2010 | Vorberg et al. | |
| 2010/0319540 A1 | 12/2010 | Garcia Andarcia et al. | |
| 2011/0033354 A1 | 2/2011 | Riemann et al. | |
| 2011/0168020 A1 | 7/2011 | Baburao et al. | |
| 2012/0060689 A1 | 3/2012 | Naumovitz et al. | |

FOREIGN PATENT DOCUMENTS

| | | |
|---|---|---|
| EP | 0798029 A2 | 10/1997 |
| FR | 2938454 A1 | 5/2010 |
| JP | 10-202054 A * | 8/1998 |
| WO | WO-2008145658 A1 | 12/2008 |
| WO | WO-2010102877 A1 | 9/2010 |

OTHER PUBLICATIONS

Reddy, et al., "Fluor's Econamine FG PlusSM Technology—An Enhanced Amine-Based CO2 Capture Process", *FLUOR*, (2003), pp. 1-11.

International Search Report for PCT/EP2012/055750, mailing date Jul. 9, 2012.

* cited by examiner

*Primary Examiner* — Timothy Vanoy
(74) *Attorney, Agent, or Firm* — Novak Druce Connolly Bove + Quigg LLP

(57) ABSTRACT

A method for removing acid gases from a fluid stream comprises a) treating the fluid stream in an absorption zone with an absorption medium which comprises an aqueous solution of at least one amine, conducting the treated fluid stream through at least two scrubbing zones and treating it with a non-acidic aqueous phase in order to transfer entrained amine and/or entrained amine decomposition products at least in part to the aqueous phase, wherein aqueous phase is recycled via at least one scrubbing zone and aqueous phase is conducted through at least one scrubbing zone without recycling. The method permits efficient retention of amines from the treated fluid streams.

16 Claims, 3 Drawing Sheets

RETENTION OF AMINES IN THE REMOVAL OF ACID GASES BY MEANS OF AMINE ABSORPTION MEDIA

CROSS-REFERENCE TO RELATED APPLICATIONS

This application claims the benefit of U.S. Provisional Application 61/469,902, filed Mar. 31, 2011, which is incorporated by reference.

BACKGROUND OF THE INVENTION

The present invention relates to a method for removing acid gases from a fluid stream, e.g. for removing carbon dioxide from flue gases.

In numerous processes in the chemical industry, fluid streams occur which contain acid gases such as, e.g., $CO_2$, $H_2S$, $SO_2$, $CS_2$, HCN, COS or mercaptans. These fluid streams can be, for example, gas streams such as natural gas, refinery gas, synthesis gas, flue gases, or reaction gases formed in the composting of waste materials comprising organic substances. The removal of the acid gases from these fluid streams is desirable for various reasons.

The removal of carbon dioxide from flue gases serves, in particular, to reduce the emission of carbon dioxide, which is considered to be the main cause of what is termed the greenhouse effect.

Synthesis gas comprises substantially carbon monoxide and hydrogen. Synthesis gas is generally produced by partial oxidation or steam reforming of hydrocarbons. The crude synthesis gas comprises acid gases such as carbon dioxide, hydrogen sulfide, or carbonyl sulfide, which must be removed.

The content of acid gases in natural gas is reduced by suitable processing measures directly at the natural gas well, since these acid gases, in the water frequently entrained by the natural gas, form acids which are corrosive.

On the industrial scale, aqueous solutions of organic bases, e.g. amines, such as, in particular, alkanolamines, are frequently used as absorption medium for removing acid gases, such as carbon dioxide, from fluid streams. On the dissolution of acid gases, ionic products are formed from the base and the acid gas components. The absorption medium can be regenerated by warming, expanding to a lower pressure, or stripping, wherein the ionic products react back to form acid gases and/or the acid gases are stripped off by means of steam. After the regeneration process, the absorption medium can be reused.

However, the amines have a vapor pressure which is not negligible. Therefore, the fluid stream freed from acid gases comprises traces of amines. Contamination of the treated fluid stream is undesirable for various reasons. For instance, it is disadvantageous when traces of amines escape into the environment together with the treated flue gas.

Synthesis gas is the starting material of further catalytic reactions. Amine traces can act here as catalyst poison.

The content of amines in natural gas or liquefied petroleum gas (LPG) produced therefrom by liquefaction can likewise be subject to restrictions.

It has been proposed in the prior art to scrub the treated fluid stream with an aqueous phase in order to transfer entrained amine at least in part into the aqueous phase.

EP 0 798 029 A2 discloses a method in which a gas is treated with a basic amine compound for absorbing carbon dioxide, and the treated gas is then contacted at 20 to 60° C. with an aqueous phase in order to transfer entrained basic amine at least in part into the aqueous phase. The aqueous phase should preferably be condensate which is condensed out of the carbon dioxide which is released in the regeneration tower.

US 2008/0159937 comprises a method for removing carbon dioxide from a gas stream, in which the gas stream that is depleted in carbon dioxide is scrubbed with water in a packed section of the absorption tower. The water can be condensate from the top of the regeneration column, or fresh water for making up lost amounts.

The use of condensate which is condensed out of the carbon dioxide which is released in the regeneration tower as scrubbing water has the advantage that the water balance of the absorption medium circuit is not impaired. On the other hand, the condensate is only available in a limited amount. Fresh water can be used as scrubbing water only in a restricted amount in order not to dilute the absorption medium and accumulate water in the method. The amount of fresh water to be added results from the difference between the water content of the incoming fluid stream and the exiting streams. For the configuration shown in FIG. 1, for example, the incoming stream 1 and the two exiting streams 21 and 25 enter into the water balance. The fresh water required to make up lost amounts is termed make-up water (stream 11 in FIG. 1). The exiting streams are saturated with water vapor. The water content of the incoming fluid stream depends on various conditions. For a water-saturated incoming fluid stream, the makeup stream available decreases with decreasing pressure difference between the absorption and the regeneration. Consequently, in particular in the case of flue gas scrubbers in which the absorption pressure is close to atmospheric pressure, the amount of make-up water available is restricted.

In order, in the case of a restricted amount of scrubbing water, nevertheless to achieve an adequate scrubbing action, it has been proposed to conduct the scrubbing water through the scrubbing zone not in a single pass, but to circulate the scrubbing water by pumping, or to recycle it, i.e. to collect it below the scrubbing zone and reapply it above the scrubbing zone. Optionally, the scrubbing water in this case can be conducted via an additional cooler. By means of the cooling, water condenses out of the treated fluid stream. In order to avoid accumulation in the scrubbing water circuit of absorption medium components that have been scrubbed out, a subquantity of the scrubbing water is discharged and replaced by make-up water. The water discharged from the scrubbing water circuit is customarily passed into the absorption medium circuit.

In Satish Reddy et al., Fluor's Econamine FG Plus$^{SM}$ Technology, presented at the Second National Conference on Carbon Sequestration, National Energy Technology Department of Energy, Alexandria Va., USA, May 5-8, 2003, a typical embodiment of a gas scrubbing process having a scrubbing zone with scrubbing water circulated by pumping is described.

By means of the recycling and optional cooling of the scrubbing water, the scrubbing action can be increased. Customary volume ratios of recycled scrubbing water and make-up water are between 10 and 500. However, owing to the recycling, a backmixing of the scrubbing water occurs. At very high volume ratios of recycled scrubbing water and make-up water, in the scrubbing zone only the action of at most one theoretical separation plate can be achieved, independently of the length of the contact section in the scrubbing zone.

WO 2010/102877 describes a method in which the gas stream that is depleted in carbon dioxide is scrubbed with an acidic aqueous solution in order to decrease the amount of amines and basic degradation products present therein. Between the carbon dioxide absorption zone and the acidic scrubbing, a scrubbing with water can be provided.

DETAILED DESCRIPTION OF THE INVENTION

Figure 1:
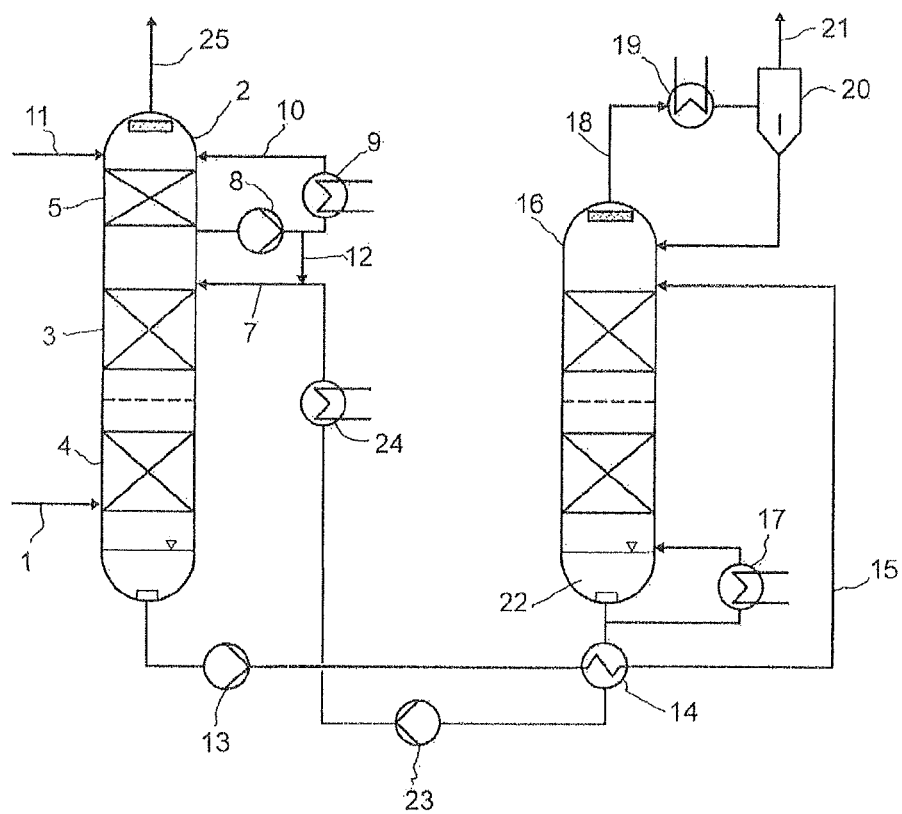
FIG. 1 shows a plant for removing acid gases from a gas stream having a scrubbing zone for scrubbing out entrained absorption liquid from the treated gas according to the prior art.

The object of the present invention is to provide a method for removing acid gases from fluid streams, in particular for removing carbon dioxide from flue gases, which permits a more efficient retention of amines from the treated fluid streams.

The invention provides a method for removing acid gases from a fluid stream, which comprises
a) treating the fluid stream in an absorption zone with an absorption medium which comprises an aqueous solution of at least one amine,
b) conducting the treated fluid stream through at least two scrubbing zones and treating it with a non-acidic aqueous phase in order to transfer entrained amine and/or entrained amine decomposition products at least in part to the aqueous phase, wherein aqueous phase is recycled via at least one scrubbing zone and aqueous phase is conducted through at least one scrubbing zone without recycling.

The treated fluid stream is treated with a non-acidic liquid aqueous phase in order to transfer entrained amine and/or entrained amine decomposition products at least in part into the aqueous phase. In other words, the amine which is passed over into the fluid stream is scrubbed out again therefrom. During the scrubbing, amine decomposition products such as nitrosamines or ammonia are also scrubbed out of the treated fluid stream.

As non-acidic aqueous phase, in particular water itself is suitable. Of course, when the method is carried out, other components, such as amine and amine decomposition products, can pass over into the aqueous phase, and so the non-acidic aqueous phase generally comprises components that are more or less different from water. The non-acidic aqueous phase is neutral or, owing to entrained amine components, slightly basic. Generally, the pH of the non-acidic aqueous phase is 7 to 11, preferably 8 to 10.

In the scrubbing zones, the non-acidic aqueous phase is conducted in counterflow to the treated fluid stream. Preferably, the scrubbing zones have packed beds, ordered packings and/or trays, in order to intensify the contact between the fluid stream and the non-acidic aqueous phase. The non-acidic aqueous phase can be distributed over the cross section of the scrubbing zone above the scrubbing zone by suitable liquid distributors.

The absorption zone is considered to be the section of an absorption column in which the fluid stream comes into mass-transfer contact with the absorption medium.

In preferred embodiments, at least one scrubbing zone is formed as a section of the absorption column arranged above the absorption zone. Preferably, all the scrubbing zones are constructed as sections of the absorption column arranged above the absorption zone for treatment with the non-acidic aqueous phase. The scrubbing zones for this purpose are a section of the absorption column above the feed of the absorption medium constructed as a back-wash section or enrichment part.

In other embodiments, at least one scrubbing zone is arranged in a scrubbing column different from the absorption column, e.g. a packed-bed column, ordered packing column, and tray column, in which the treated fluid stream is scrubbed with the non-acidic aqueous phase.

According to the invention a non-acidic aqueous phase is recycled via at least one scrubbing zone. The non-acidic aqueous phase for this purpose is collected beneath the scrubbing zone, e.g. by means of a suitable collecting tray, and pumped via a pump to the upper end of the scrubbing zone. In preferred embodiments, the recycled non-acidic aqueous phase is cooled, preferably to a temperature of 20 to 70° C., in particular 30 to 60° C. For this purpose the non-acidic aqueous phase is expediently pumped in circulation via a cooler. In order to prevent accumulation in the scrubbing water circuit of absorption medium components that have been scrubbed out, expediently a substream of the non-acidic aqueous phase is discharged and replaced by feed water.

Non-acidic aqueous phase is conducted through at least one scrubbing zone without recycling, i.e. the non-acidic aqueous phase passes through the scrubbing zone in a single passage in counterflow to the treated fluid stream.

In a preferred embodiment, a first scrubbing zone is arranged above the absorption zone and a second scrubbing zone is arranged above the first scrubbing zone, wherein aqueous phase is recycled via the second scrubbing zone, a substream of the non-acidic aqueous phase recycled via the second scrubbing zone is conducted through the first scrubbing zone and non-acidic aqueous phase draining from the first scrubbing zone is combined with the absorption medium in the absorption zone. In preferred embodiments, the non-acidic aqueous phase recycled via the second scrubbing zone is cooled, preferably to a temperature of 20 to 70° C., in particular 30 to 60° C. For this purpose, the non-acidic aqueous phase is expediently pumped in circulation via a cooler. Expediently, feed water is fed into the second scrubbing zone in order to replace the volume of the substream.

In another embodiment, a first scrubbing zone is arranged above the absorption zone and a second scrubbing zone is arranged above the first scrubbing zone, wherein non-acidic aqueous phase is recycled via the first scrubbing zone, feed water is applied to the second scrubbing zone, the feed water is conducted through the second scrubbing zone and combined with the non-acidic aqueous phase in the first scrubbing zone. Expediently, a substream of the recycled non-acidic aqueous phase is removed and the substream is preferably passed into the absorption medium circuit. This embodiment is generally less preferred, since the second scrubbing zone is operated exclusively with feed water and the amount of aqueous phase which is hydraulically necessary can fall below that which is required for a functioning scrubbing, e.g. for wetting the internals in the scrubbing zone.

The feed water can comprise at least in part condensate which is condensed out of the acid gases released in the regeneration, e.g. in a stripper. The use of this condensate as feed water has the advantage that the water balance of the absorption medium circuit is not impaired. On the other hand, the condensate, depending on the conditions in the stripper, can comprise amines from the absorption medium, and so the scrubbing action of the condensate is restricted and very low amine concentrations cannot be achieved in the treated fluid stream. The (exclusive) use of the condensate as feed water is therefore not generally preferred.

Preferably, the feed water comprises, at least in part, fresh water. Fresh water is considered to be water, e.g. superheated steam condensate, which comprises no significant amounts of amine, amine decomposition products or other absorption medium components. Preferably, the amount of fresh water substantially corresponds to the amount of water lost from the absorption medium circuit (make-up water) in order not to impair the water balance of the absorption medium circuit and to prevent accumulation of water.

The scrubbing according to the invention of the treated fluid stream permits the removal of the majority of the entrained amine and/or entrained amine decomposition products. A more substantial purification of the treated fluid stream for removing the last traces of entrained amine and/or for removing basic amine decomposition products having a high vapor pressure succeeds in one embodiment of the method according to the invention in which the treated fluid stream is then scrubbed with an acidic aqueous solution. For this purpose, the treated fluid stream can be conducted through a scrubbing zone, preferably in a scrubbing column, e.g. a packed-bed, ordered packing and tray column, via which the acidic aqueous solution is recycled. The acid protonates the entrained amine traces or amine decomposition products and in this manner drastically decreases the vapor pressure thereof. The protonated compounds, owing to the salt-like character thereof, are readily transferred into the aqueous phase.

Suitable acids are inorganic or organic acids, such as sulfuric acid, sulfurous acid, phosphoric acid, nitric acid, acetic acid, formic acid, carbonic acid, citric acid and the like. Preferably, the acid used has a pKs from −4 to 7. The preferred pH of the acidic aqueous solution is 3 to 7, in particular 4 to 6.

As acidic aqueous solution, in particular acidic process waters are suitable. Such acidic process waters occur, in particular, in the treatment of sulfur-dioxide-comprising gases, e.g. in an $SO_2$-prepurification stage. For instance, in the cooling or prescrubbing of sulfur-dioxide-comprising gases, an acidic condensate is obtained which can be used as acidic process water.

By means of the absorption of amines and/or amine decomposition products into the acidic aqueous solution, the concentration of the amines and/or amine decomposition products in the acidic aqueous solution increases. In order to avoid excessive concentrations of dissolved salts in the acidic aqueous solution, expediently a substream of the acidic aqueous solution is discharged and this is replaced by fresh acidic aqueous solution. The amines or amine decomposition products, such as ammonia, can be at least partially recovered from the discharged substream. For this purpose, the discharged aqueous solution is treated with an alkali, e.g. sodium hydroxide, wherein the amines or amine decomposition products are released.

Alternatively, the discharged aqueous solution can be discarded or fed to a waste water treatment.

Before the treatment with the absorption medium, the fluid stream, e.g. flue gas, is subjected, preferably to a scrubbing with an aqueous liquid, in particular with water, in order to cool the fluid stream and to moisten it (quench). During the scrubbing, dusts or gaseous impurities such as sulfur dioxide can also be removed. In the treatment of sulfur-dioxide-comprising gases, an acidic process water is thus obtained, which can be used as the above described acidic aqueous solution.

The fluid stream is treated with the absorption medium in an absorption tower or absorption column, e.g. packed-bed, ordered packing and tray column. The fluid stream is treated with the absorption medium, preferably in an absorption column in counterflow. The fluid stream in this case is generally fed into a lower region, and the absorption medium into an upper region, of the column.

The temperature of the absorption medium in the absorption step is generally about 20 to 90° C., when a column is used, for example 20 to 60° C. at the top of the column and 30 to 90° C. at the bottom of the column. A fluid stream low in acid gas components, i.e. a fluid stream depleted in these components, is formed, and also an absorption medium that is loaded with acid gas components.

Carbon dioxide and other acid gases can be released in a regeneration step from the absorption medium that is loaded with the acid gas components, wherein a regenerated absorption medium is obtained. In the regeneration step, the loading of the absorption medium is decreased and the resultant regenerated absorption liquid is preferably then recirculated to the absorption step.

Generally, the loaded absorption liquid is regenerated by warming, e.g. to 70 to 130° C., expansion, stripping with an inert fluid or a combination of two or all of these measures. Preferably, the loaded absorption liquid is regenerated in a stripper. The stripping gas required for the stripping is generated by partial evaporation of the absorption liquid in the bottom-phase of the stripper.

Before the regenerated absorption medium is reintroduced into the absorption tower, it is cooled to a suitable absorption temperature. In order to utilize the energy comprised in the hot regenerated absorption medium, it is preferred to preheat the loaded absorption medium from the absorber by indirect heat exchange with the hot regenerated absorption medium. By means of the heat exchange, the loaded absorption medium is brought to a higher temperature, and so in the regeneration step a lower energy usage is required. By means of the heat exchange, also, a partial regeneration of the loaded absorption medium can already proceed with release of carbon dioxide.

The absorption medium comprises at least one amine. Preferably, the amine comprises at least one primary or secondary amine.

Preferred amines are the following:
(i) amines of the formula I:

$$NR^1(R^2)_2 \qquad (I)$$

where $R^1$ is selected from $C_2$-$C_6$ hydroxyalkyl groups, $C_1$-$C_6$ alkoxy-$C_2$-$C_6$ alkyl groups, hydroxy $C_1$-$C_6$ alkoxy-$C_2$-$C_6$ alkyl groups and 1-piperazinyl-$C_2$-$C_6$ alkyl groups, and $R^2$ is selected independently from H, $C_1$-$C_6$ alkyl groups and $C_2$-$C_6$ hydroxyalkyl groups;
(ii) amines of the formula II:

$$R^3R^4N-X-NR^5R^6 \qquad (II)$$

where $R^3$, $R^4$, $R^5$ and $R^6$ independently of one another are selected from H, $C_1$-$C_6$ alkyl groups, $C_2$-$C_6$ hydroxyalkyl groups, $C_1$-$C_6$ alkoxy-$C_2$-$C_6$ alkyl groups and $C_2$-$C_6$-aminoalkyl groups and X is a $C_2$-$C_6$ alkylene group, -$X^1$—$NR^7$—$X^2$- or -$X^1$—O—$X^2$-, where $X^1$ and $X^2$ independently of one another are $C_2$-$C_6$ alkylene groups and $R^7$ is H, a $C_1$-$C_6$ alkyl group, $C_2$-$C_6$ hydroxyalkyl group or $C_2$-$C_6$ aminoalkyl group;
(iii) 5- to 7-membered saturated heterocycles having at least one nitrogen atom in the ring, which can comprise one or two further hetero atoms in the ring selected from nitrogen and oxygen, and (iv) mixtures thereof.

Specific examples are:

(i) 2-aminoethanol (monoethanolamine), 2-(methylamino) ethanol, 2-(ethylamino)-ethanol, 2-(n-butylamino)ethanol, 2-amino-2-methylpropanol, N-(2-aminoethyl)-piperazine, methyldiethanolamine, ethyldiethanolamine, dimethylaminopropanol, t-butylaminoethoxyethanol, 2-aminomethylpropanol;

(ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine, tetramethylhexamethylenediamine;

(iii) piperazine, 2-methylpiperazine, N-methylpiperazine, 1-hydroxyethylpiperazine, 1,4-bis-hydroxyethylpiperazine, 4-hydroxyethylpiperidine, homopiperazine, piperidine, 2-hydroxyethylpiperidine and morpholine; and (iv) mixtures thereof.

Thereof, monoethanolamine, piperazine, methylaminopropylamine, diethanolamine, 1-hydroxyethylpiperazine are particularly preferred.

Generally, the absorption medium comprises 10 to 60% by weight amine.

The absorption liquid can also comprise additives, such as corrosion inhibitors, enzymes etc. Generally, the amount of such additives is in the range of about 0.01-3% by weight of the absorption liquid.

The method according to the invention is suitable for treating fluid streams, in particular gas streams of all types. The acid gases are, in particular, $CO_2$, $H_2S$, COS and mercaptans. Furthermore, $SO_3$, $SO_2$, $CS_2$ and HCN can also be removed. Generally, the acid gases comprise at least $CO_2$ or consist solely of $CO_2$.

Fluids which comprise the acid gases are, firstly, gases, such as natural gas, synthesis gas, coke oven gas, cracked gas, coal gasification gas, recycled gas, landfill gases and combustion gases, and secondly liquids which are substantially immiscible with the absorption medium such as Liquefied Petroleum Gas (LPG) or Natural Gas Liquids (NGL).

In preferred embodiments, the fluid stream is a (i) hydrogen-comprising fluid stream comprising fluid stream; these include synthesis gases which can be produced, e.g. by coal gasification or steam reforming, and are optionally subjected to a water gas shift reaction; the synthesis gases are used, e.g. for producing ammonia, methanol, formaldehyde, acetic acid, urea, for the Fischer-Tropsch synthesis or for energy production in an Integrated Gasification Combined Cycle (IGCC) process;

(ii) hydrocarbon-comprising fluid stream; these include natural gas, exhaust gases of various refinery processes, such as the Tailgas Unit (TGU), of a Visbreaker (VDU), of a Catalytic Cracker (LRCUU/FCC), of a Hydrocracker (HCU), of a Hydrotreater (HDS/HTU), of a Coker (DCU), of an Atmospheric Distillation (CDU) or of a Liquid Treater (e.g. LPG).

The method or absorption medium according to the invention is suitable for treating oxygen-comprising fluid streams, such as flue gases.

In preferred embodiments, the oxygen-comprising fluid stream originates from a) the oxidation of organic substances, b) the composting or storage of waste materials comprising organic substances, or c) the bacterial decomposition of organic substances.

In some embodiments, the partial pressure of carbon dioxide in the fluid stream is less than 500 mbar, e.g. 30 to 150 mbar.

The oxidation can be carried out with appearance of flame, i.e. as conventional combustion, or as oxidation without appearance of flame, e.g. in the form of a catalytic oxidation or partial oxidation. Organic substances which are subjected to the combustion are customarily fossil fuels such as coal, natural gas, crude oil, petroleum, diesel, raffinates or kerosine, biodiesel or waste materials having a content of organic substances. Starting materials of the catalytic (partial) oxidation are, e.g. methanol or methane which can be reacted to form formic acid or formaldehyde.

Waste materials which are subjected to oxidation, composting or storage, are typically domestic refuse, plastic wastes or packaging refuse.

The combustion of the organic substances proceeds usually in customary combustion plants with air. Composting and storage of waste materials comprising organic substances proceeds generally in refuse landfills. The exhaust gas or the exhaust air of such plants can advantageously be treated by the method according to the invention.

As organic substances for bacterial decomposition, customarily stable manure, straw, liquid manure, sewage sludge, fermentation residues, silage and the like are used.

Bacterial decomposition proceeds, e.g. in customary biogas plants. The exhaust air of such plants can advantageously be treated by the method according to the invention.

The method is also suitable for treating the exhaust gases of fuel cells or chemical synthesis plants which make use of a (partial) oxidation of organic substances.

The fluid streams of the above origins a), b) or c) can have, for example, either the pressure which roughly corresponds to the pressure of the ambient air, that is to say, e.g. atmospheric pressure or a pressure which deviates from atmospheric pressure by up to 1 bar.

The invention is illustrated in more detail by the accompanying drawing and the examples hereinafter.

FIG. 1 shows a plant for removing acid gases from a gas stream having a scrubbing zone for scrubbing out entrained absorption liquid from the treated gas according to the prior art.

Figure 2:
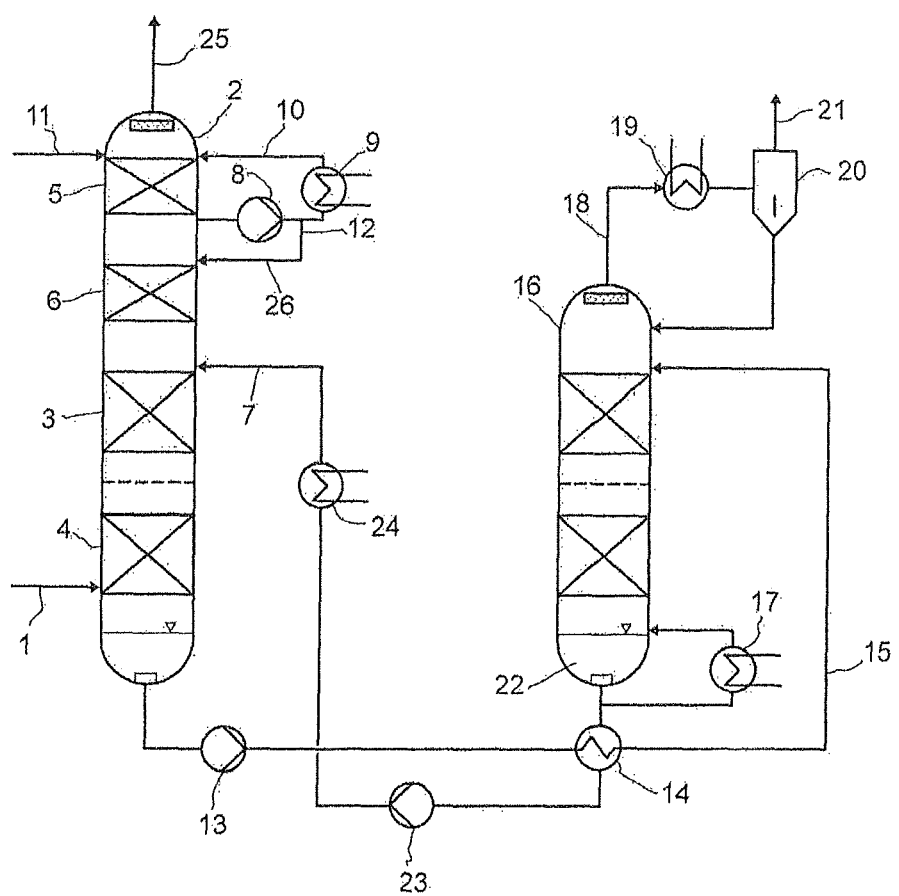
FIG. 2 shows a plant for removing acid gases from a gas stream, which plant is suitable for carrying out the method according to the invention.

FIG. 2 shows a plant for removing acid gases from a gas stream, which plant is suitable for carrying out the method according to the invention.

Figure 3:
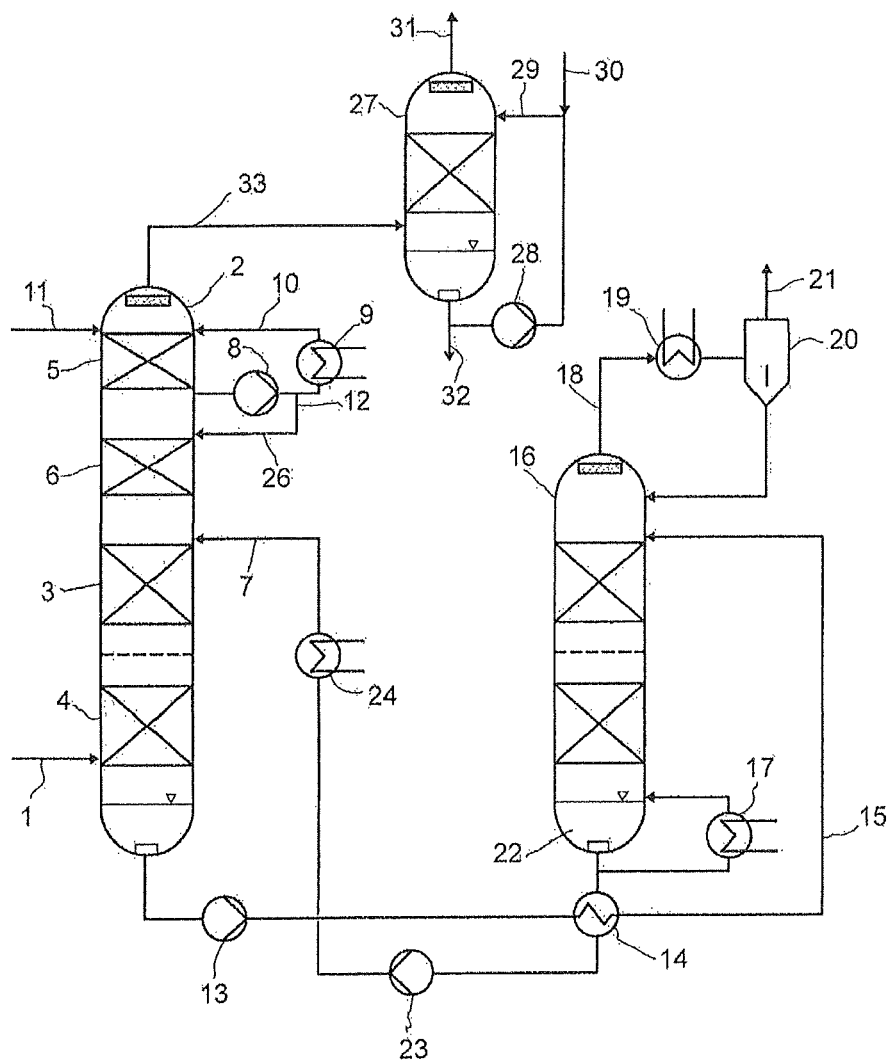
FIG. 3 shows a plant for removing acid gases from a gas stream, which plant is suitable for carrying out a further embodiment of the method according to the invention.

FIG. 3 shows a plant for removing acid gases from a gas stream, which plant is suitable for carrying out a further embodiment of the method according to the invention.

According to FIG. 1, a gas stream 1 is passed into the lower part of an absorption column 2. The absorption column 2 has absorption zones 3, 4 and a scrubbing zone 5. In the absorption zones 3, 4, the gas is brought into contact in counterflow with an absorption medium which is introduced into the absorption column 2 via the line 7 above the absorption zones. The gas depleted in acid gases is scrubbed in the scrubbing zone 5 with an aqueous phase which is recycled via the pump 8, the cooler 9 and line 10. Via line 11, fresh water is applied to the scrubbing zone 5 to compensate for amounts lost (make-up water). In the scrubbing zone 5, the water-vapor-saturated treated gas is simultaneously cooled, as a result of which water is condensed out. By means of the water that is condensed out and the make-up water, liquid is fed to the scrubbing circuit. Excess liquid phase from the scrubbing circuit is passed via the line 12 into the absorption medium circuit. An accumulation in the scrubbing water circuit of absorption medium components that have been scrubbed out of the treated flue gas is thereby prevented. The treated gas stream leaves the absorption column 2 via the line 25.

The absorption medium loaded with carbon dioxide is taken off at the bottom of the absorption column 2 and conducted via the pump 13, heat exchanger 14 and line 15 into the stripper 16. In the lower part of the stripper 16, the loaded absorption medium is warmed and partially evaporated by the evaporator 17. By means of the temperature elevation, some of the absorbed carbon dioxide is transferred back into the gas phase. The gas phase 18 is taken off at the top of the stripper 16 and fed to the condenser 19.

Condensate is collected in the phase separation vessel 20 and recirculated to the stripper 16. The gaseous carbon dioxide is taken off as stream 21. The regenerated absorption medium 22 is recirculated back to the absorption column 2 via the heat exchanger 14, pump 23, the cooler 24 and line 7.

In FIG. 2, the same reference signs have the same meaning as in FIG. 1. The absorption column 2 has two scrubbing zones 5, 6. The gas depleted in acid gas is scrubbed in the scrubbing zone 6 with an aqueous phase which is applied via the line 25 above the scrubbing zone 6. The treated gas then passes through the scrubbing zone 5 and is scrubbed with an aqueous phase which is recycled via the pump 9, the cooler 9 and line 10. Via line 11, fresh water is applied to the scrubbing zone 5 for compensating for amounts lost (make-up water). Excess liquid phase from the scrubbing water circuit is not passed directly into the absorption medium circuit, but is applied via the line 26 above the scrubbing zone 6. The aqueous phase draining out of the scrubbing zone 6 runs into the absorption zone 3 in the interior of the absorption column 2.

FIG. 3 shows a further embodiment of the invention. In FIG. 3, the same reference signs have the same meaning as in FIG. 2. The treated gas leaving the absorption column 2 is fed via the line 33 to a scrubbing column 27 and scrubbed with an acidic aqueous solution which is pumped in circulation via the pump 28 and line 29. Exhausted acidic aqueous solution is removed via line 32. Fresh acidic aqueous solution is introduced via line 30. The treated gas leaves the plant via line 31.

COMPARATIVE EXAMPLE 1

A plant according to FIG. 1 was used. The absorption column had a diameter of 600 mm; as internals, a structured packing having a specific surface area of 250 m$^2$/m$^3$ was used. Above the feed of the absorption medium, a scrubbing zone for water scrubbing was installed having recycling and cooling. The bed height of the scrubbing zone was 3 m.

A 32% strength by weight aqueous monoethanolamine solution was used as a basic absorption medium which flowed in at 40° C. Flue gas (1563 kg/h) was fed to the absorption column at a temperature of 40° C. and a water content of 3.6% by volume and a $CO_2$ content of 14.0% by volume. In the plant, 90% of the fed $CO_2$ was separated off. The amount of scrubbing water pumped in circulation was 5500 kg/h and the scrubbing water was cooled to 41° C. 34 kg/h of make-up water were fed to the plant. The temperature of the gas above the absorption section was 67° C. and the gas was cooled via the water scrubbing to 41° C.

The content of monoethanolamine in the scrubbing water was determined using a gas chromatograph and was 0.8% by weight.

EXAMPLE 2

A plant according to FIG. 2 was used. Above the feed of the absorption medium, a first scrubbing zone (without recycling) was installed at a height of 4.5 m, above the first scrubbing zone, a second scrubbing zone was installed at a height of 3 m for water scrubbing with recycling and cooling.

The flue gas rate was 1540 kg/h with a water content of 3.6% by volume and a $CO_2$ content of 14% by volume, of which 90% were separated off as in comparative example 1. The content of monoethanolamine in the absorption medium was 27% by weight. In the second scrubbing zone, 5000 kg/h of scrubbing water were circulated and cooled in the course of this to 39° C. 28 kg/h of make-up water were fed to the second scrubbing zone. By means of the cooling of the gas in the second scrubbing zone (from 63.5° C. to 39° C.), water was additionally condensed out. A volumetric flow rate of 188 kg/h of water was passed into the first scrubbing zone.

No monoethanolamine could be detected by means of a gas chromatograph in the recycled scrubbing water using this configuration. The limit of detection was 0.01% by weight.

The differing contents of monoethanolamine in the recycled scrubbing water correlate with corresponding contents of monoethanolamine in the treated fluid stream, i.e. the treated fluid stream that is leaving the absorption column, in example 2, comprised significantly less monoethanolamine than in comparative example 1.

By means of a simulation model, calculations were carried out for both configurations (comparative example 1 and example 2). The basis of the simulation model is a thermodynamic model based on the electrolyte-NRTL approach of Chen et al. (Chen, C. C; Evans, L. B.: A local Composition Model for the Excess Gibbs Energy of Aqueous Electrolyte Solutions, AIChE J. (1986) 32(3), 444), by means of which the phase equilibrium for this system can be described. The simulation of the absorption processes is described by means of a mass-transfer-based approach; details in this respect are described in Asprion (Asprion, N.: Nonequilibrium Rate-Based Simulation of Reactive Systems: Simulation Model, Heat Transfer, and Influence of Film Discretization; Ind. Eng. Chem. Res. (2006) 45(6), 2054-2069).

COMPARATIVE EXAMPLE 3

This example is based on the plant configuration of comparative example 1. The absorption column is equipped with a structured packing having a geometric surface area of 250 m$^2$/m$^3$ and has a diameter of 600 mm. The scrubbing zone with recycling and cooling has a packing height of 3 m.

The simulation is based on the following values: 1540 kg/h of flue gas having a composition of 14% by volume $CO_2$ and 3.6% by volume of water, 5.5% by volume oxygen and 76.9% by volume nitrogen is passed into the absorption column at 40° C. There, 90% of the carbon dioxide is separated off in counterflow with a 29.3% by weight aqueous monoethanolamine solution. The regenerated absorption medium flows in at a temperature of 40° C. The recycled scrubbing water is cooled to 40° C. 38 kg/h of make-up water are required. A residual content of 5 v-ppm of MEA is calculated at the exit of the water scrubber using this configuration.

EXAMPLE 4

This example is based on the plant configuration of example 2. Above the feed of the absorption medium, there was installed a first scrubbing zone (without recycling) of a height of 4.5 m, above the first scrubbing zone a second scrubbing zone was installed of a height of 3 m for water scrubbing with recycling and cooling.

In counterflow to the gas, 209 kg/h of scrubbing water was applied to the first scrubbing zone, which scrubbing water amount corresponds to the amount of the make-up water applied in the second scrubbing zone and the water condensed out by the cooling of the gas. A monoethanolamine content in the exiting gas of 40 v-ppb was achieved thereby. The liquid loading in the first scrubbing zone is 0.7 $m^3/(m^2 h)$ and is thus above the dewetting limit of the structured packing (manufacturer's details: 0.2 $m^3/(m^2 h)$; source: Sulzer brochure).

EXAMPLE 5

In the plant configuration of example 4, the scrubbing zones are exchanged. Above the feed of the absorption medium there is situated a first scrubbing zone having recycling and cooling of a height of 3 m, and above the first scrubbing zone, a second scrubbing zone, of a height of 3 m (without recycling). The low-$CO_2$ gas is first passed through the first scrubbing zone and then in counterflow to the make-up water through the second scrubbing zone. For the second scrubbing zone, this produces a liquid loading of only 0.1 $m^3/(m^2 h)$. This is below the dewetting limit of the packing used, and a sufficient or uniform wetting and thus separation efficiency cannot be ensured thereby.

The invention claimed is:

1. A method for removing acid gases from a fluid stream, which comprises
    a) treating the fluid stream in an absorption zone with an absorption medium which comprises an aqueous solution of at least one amine,
    b) conducting the treated fluid stream through at least two scrubbing zones and treating it with a non-acidic aqueous phase in order to transfer entrained amine and/or entrained amine decomposition products at least in part to the aqueous phase, wherein aqueous phase is recycled via at least one scrubbing zone and aqueous phase is conducted through at least one scrubbing zone without recycling.

2. The method according to claim 1, wherein the at least two scrubbing zones have packed beds, ordered packings and/or trays.

3. The method according to claim 1, wherein the absorption zone is arranged in an absorption column and at least one scrubbing zone is formed as a section of the absorption column arranged above the absorption zone.

4. The method according to claim 1, wherein the absorption zone is arranged in an absorption column and at least one scrubbing zone is arranged in a scrubbing column different from the absorption column.

5. The method according to claim 1, wherein a first scrubbing zone is arranged above the absorption zone and a second scrubbing zone is arranged above the first scrubbing zone, wherein aqueous phase is recycled via the second scrubbing zone, a substream of the aqueous phase recycled via the second scrubbing zone is conducted through the first scrubbing zone and aqueous phase draining from the first scrubbing zone is combined with the absorption medium in the absorption zone.

6. The method according to claim 5, wherein the aqueous phase recycled via the second scrubbing zone is cooled.

7. The method according to claim 5, wherein feed water is fed into the second scrubbing zone.

8. The method according to claim 7, wherein the loaded absorption medium is regenerated in a stripper by warming with partial evaporation of the absorption medium, wherein the acid gases are at least in part released, and the released acid gases are cooled in order to at least partially condense out entrained water vapor, and the condensate is used at least in part as feed water.

9. The method according to claim 7, wherein the feed water comprises at least in part fresh water.

10. The method according to claim 9, wherein the amount of fresh water substantially corresponds to the amount of water lost from the absorption medium circuit.

11. The method according to claim 1, wherein the loaded absorption medium is regenerated in a stripper by warming with partial evaporation of the absorption medium, wherein the acid gases are at least in part released.

12. The method according to claim 1, wherein the treated fluid stream is then scrubbed with an acidic aqueous solution.

13. The method according to claim 12, wherein the treated fluid stream is conducted through a scrubbing zone via which the acidic aqueous solution is recycled.

14. The method according to claim 12, wherein, as acidic aqueous solution, an acidic process water from the treatment of sulfur dioxide-comprising gases is used.

15. The method according to claim 1, wherein the amine comprises at least one primary or secondary amine.

16. The method according to claim 1, wherein the amine comprises at least one alkanolamine and/or at least piperizine derivative.

* * * * *